(12) United States Patent
Zhang et al.

(10) Patent No.: US 9,965,484 B1
(45) Date of Patent: May 8, 2018

(54) TEMPLATE-DRIVEN DATA EXTRACTION AND INSERTION

(71) Applicant: CA, Inc., Islandia, NY (US)

(72) Inventors: Guoqiang Zhang, Beijing (CN); Lizeng Zhang, Beijing (CN); Yingwei Cai, Beijing (CN); Chenyue Duan, Beijing (CN)

(73) Assignee: CA, INC., New York, NY (US)

( * ) Notice: Subject to any disclaimer, the term of this patent is extended or adjusted under 35 U.S.C. 154(b) by 0 days. days.

(21) Appl. No.: 13/761,537

(22) Filed: Feb. 7, 2013

(51) Int. Cl.
*G06F 17/30* (2006.01)

(52) U.S. Cl.
CPC .............................. *G06F 17/30115* (2013.01)

(58) Field of Classification Search
CPC ............ G06F 17/30067; G11B 27/105; G11B 27/329
USPC ........................................................ 707/821
See application file for complete search history.

(56) References Cited

U.S. PATENT DOCUMENTS

| | | | | |
|---|---|---|---|---|
| 4,899,136 A * | 2/1990 | Beard et al. | ................... | 345/156 |
| 5,619,685 A * | 4/1997 | Schiavone | ....................... | 703/20 |
| 7,415,664 B2 * | 8/2008 | Aureglia et al. | .............. | 715/212 |
| 7,881,999 B2 * | 2/2011 | Bagheri | .......................... | 705/35 |
| 8,954,989 B1 * | 2/2015 | Colton | .................... | H04L 67/00 709/203 |
| 2003/0226105 A1 * | 12/2003 | Waldau | ......................... | 715/503 |
| 2005/0203935 A1 * | 9/2005 | McArdle | ................. | G06F 17/24 |
| 2005/0268227 A1 * | 12/2005 | Carlson et al. | ............... | 715/517 |
| 2007/0192671 A1 * | 8/2007 | Rufener | ............... | G06F 17/248 715/205 |
| 2009/0183117 A1 * | 7/2009 | Chang | ........................... | 715/810 |
| 2012/0109805 A1 * | 5/2012 | Ramachandra et al. | ......... | 705/35 |

OTHER PUBLICATIONS

Citrine: Prividing Intelligent Copy-and_Paste, Jeffrey Stylos, et al. Oct. 24-27, 2004.*

* cited by examiner

*Primary Examiner* — Hung T Vy
(74) *Attorney, Agent, or Firm* — Vierra Magen Marcus LLP

(57) ABSTRACT

Methods for extracting data from a source file using a copy template and writing data to a target file using a paste template are described. The copy template may provide grammatical rules for parsing the source file in order to extract tokens corresponding with a plurality of data fields. The paste template may provide a mapping of extracted tokens into the target file. In some embodiments, a source file may comprise a word processing document, spreadsheet, or webpage that includes data displayed in a grid, list, or other structured format. Each row of a grid or list may display a limited number of properties or data values associated with the row. In some embodiments, additional information not displayed in the row may be extracted without having to manually select the additional information.

19 Claims, 9 Drawing Sheets

| Name | Effective from | Effective to | Status | Type |
|---|---|---|---|---|
| ContractA | 7/18/2012 | 7/18/2017 | Preliminary | Service Level Agreement |
| ContractB | 7/18/2012 | 7/18/2017 | Preliminary | Service Level Agreement |
| ContractC | 7/18/2012 | 7/18/2017 | Preliminary | Service Level Agreement |

FIG. 2A

| | |
|---|---|
| Name: | $Contract_Name  ~206 |
| Contract Type: | $Contract_Type |
| Status: | $Status_ID |
| Effective: | $Effective_Dates |
| Primary Contract Party: | $Prim_cont |
| Services: | $Services_Type |
| Version: | $Version |
| TimeZone: | $TimeZone |
| Currency: | $Currency_Type  ~210 |

FIG. 2B

Name: ContractA ~246

Contract Type: Service Level Agreement

Status: Preliminary

Effective: 7/18/2012 00:00 to 7/18/2017 00:00 following contract time zone

Primary Contract Party: Receiver-CP1

Services: Mobile

Version: 1 of 1 (Preliminary)

TimeZone: GMT

Currency: US Dollars ~250

FIG. 2C

|  | From ▼ | |
|---|---|---|
| Send | To... | |
|  | Cc... | |
|  | Subject: | ContractA details |

Hi,

This is the details of ContractA I've mentioned before:

| Contract | Name | ContractA ～236 |
|---|---|---|
|  | Contract Type | Service Level Agreement |
|  | Status | Preliminary |
|  | Effective | 7/18/2012 00:00 to 7/18/2017 00:00 following contract time zone |
|  | Primary Contract Party | Receiver CP1 |
|  | Services | Mobile |
| Version | Version | 1 of 1(Preliminary) |
|  | Effective | 7/18/2012 00:00 to 7/18/2017 00:00 following contract time zone |
| Details | TimeZone | GMT |
|  | Currency | US Dollars ～ 238 |
|  |  |  |

Thanks,

FIG. 2D

TEMPLATE-DRIVEN DATA EXTRACTION AND INSERTION

BACKGROUND

The present disclosure relates to methods for automating the transfer of data within a data file or between different data files.

Home and business productivity applications typically include word processing applications, spreadsheet applications, presentation facilitation applications, database applications, publishing applications, web browsing applications, email applications, and personal information management applications. These applications typically allow an end user of a computing device to compose, manipulate, edit, organize, and format data stored in files (e.g., a file readable by a word processing application). Some home and business productivity applications allow for copy-and-paste and/or cut-and-paste operations to be performed when an end user enters key combinations (e.g., Ctrl+C and Ctrl+V) or selects the desired functionality using a pulldown menu or toolbar button. Copy-and-paste functionality allows for the copying of selected data (e.g., text) from a source to a clipboard, and then from the clipboard to a destination. The clipboard may comprise a software utility or application running on an operating system that facilitates data storage and/or data transfer between documents and applications running on the operating system (e.g., acting as a temporary buffer for copying-and-pasting data between a spreadsheet application and a word processing application). The source and destination may be located in the same file or in different files. Copy-and-paste functionality may also allow formatting styles to be copied and pasted along with selected text.

BRIEF SUMMARY

According to one aspect of the present disclosure, technology for automating the transfer of data within a data file or between different data files is disclosed.

One embodiment comprises acquiring a set of data strings corresponding with a set of data fields, detecting a paste triggering event, identifying a target file opened in a target application in response to the detecting a paste triggering event, and acquiring a paste template associated with the target application. The paste template comprises mappings for a subset of the set of data fields. The method further comprises determining a paste point within the target file and writing a subset of the set of data strings to a location within the target file associated with the paste point. The subset of the set of data strings corresponds with the subset of the set of data fields. The method further comprises displaying the target file comprising the subset of the set of data strings.

The method may further comprise detecting a copy triggering event, identifying a source application, and acquiring a copy template associated with the source application. The copy template is associated with the set of data fields. The method may further comprise identifying a source file opened within the source application in response to the detecting a copy triggering event, determining a copy point within the source file, and extracting the set of data strings from the source file based on the copy template and the copy point. Each data string of the set of data strings may correspond with a data field of the set of data fields.

One embodiment comprises a system comprising a storage device and a processor in communication with the storage device. The storage device stores a set of data strings corresponding with a set of data fields. The processor detects a paste triggering event and identifies a target file opened in a target application in response to the paste triggering event. The processor acquires a paste template associated with the target application. The paste template comprises mappings for a subset of the set of data fields. The processor determines a paste point within the target file and writes a subset of the set of data strings to a location within the target file associated with the paste point. The subset of the set of data strings corresponds with the subset of the set of data fields.

One embodiment comprises a computer program product comprising a computer readable storage medium having computer readable program code embodied therewith. The computer readable program code configured to store a set of data strings corresponding with a set of data fields, configured to detect a paste triggering event and identify a target file opened in a target application in response to the paste triggering event, and configured to acquire a paste template associated with the target application. The paste template comprises mappings for a subset of the set of data fields. The computer readable program code configured to determine a paste point within the target file and to write a subset of the set of data strings to a location within the target file associated with the paste point. The subset of the set of data strings corresponds with the subset of the set of data fields.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

FIG. 2A depicts one embodiment of a spreadsheet.

FIG. 2B depicts one embodiment of a portion of a paste template.

FIG. 2C depicts one embodiment of data written to a target file using a first paste template.

FIG. 2D depicts one embodiment of data written to a target file using a second paste template.

DETAILED DESCRIPTION

Figure 1:
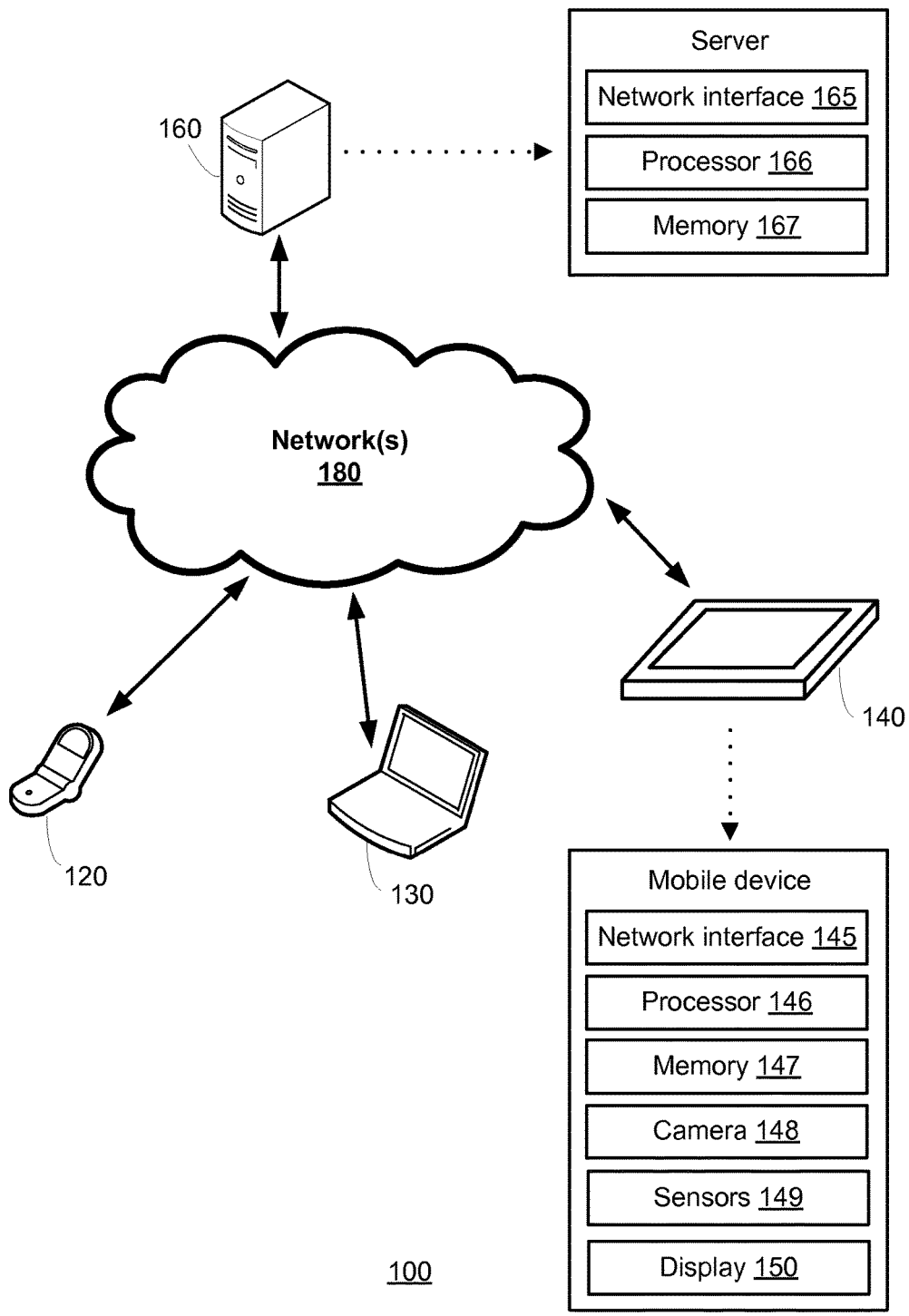
FIG. 1 depicts one embodiment of a networked computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for extracting data from a source file using a copy template and writing the data (or a subset of the data) to a target file using a paste template. The copy template may provide grammatical rules for parsing the source file in order to extract tokens corresponding with one or more data fields. The paste template may provide a mapping of extracted tokens into the target file. The tokens may comprise character strings and may be extracted using lexical analysis. A character string may include a sequence of letters, numbers, and/or other symbols. In some embodiments, a source file may comprise a word processing document, spreadsheet, or webpage that includes data displayed in a grid, list, or other structured format. Each row of a grid or list may display a limited number of properties or data values associated with the row. For example, each row may correspond with a business entity, but each row may only display a subset of the total number of properties and data fields associated with the business entity. In some cases, in order to display additional information associated with the row, a detailed page associated with the row may need to be selected. In some embodiments, a copy template may provide instructions for extracting the additional information without having to manually select the detailed page (or the additional information). A copy template may also allow multiple rows of data to be copied (e.g., to a clipboard) even though only a single row is selected. The technology disclosed herein may increase workplace productivity by enabling template-driven copy-and-paste (or cut-and-paste) functionality between different computing applications (e.g., copying data from a spreadsheet application and pasting a subset of the data into an email application).

FIG. 1 depicts one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 120, mobile device 130, mobile device 140, and server 160. In some embodiments, the plurality of computing devices may include other computing devices not shown. A computing device may comprise various computing devices such as a mobile phone, laptop computer, desktop computer, or tablet computer. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as server 160, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein.

One embodiment of mobile device 140 includes a network interface 145, processor 146, memory 147, camera 148, sensors 149, and display 150, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Camera 148 may capture images or video. Sensors 149 may generate motion and/or orientation information associated with mobile device 140. Sensors 149 may comprise an inertial measurement unit (IMU). Display 150 may display digital images and/or videos. Display 150 may comprise a touchscreen display.

In some embodiments, various components of mobile device 140 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In some embodiments, a mobile device, such as mobile device 140, may allow an end user of the mobile device to extract (or copy) data from a source file using a copy template and to write (or paste) data to a target file using a paste template. The copy template may provide grammatical rules for parsing the source file in order to extract tokens corresponding with one or more data fields. Each of the parsing rules may correspond with a priority, such that higher priority rules are applied before lower priority rules. In some cases, the tokens may comprise character strings and may be extracted using lexical analysis. The copy template may also provide instructions for extracting additional information associated with an end user selection of the source file without the end user having to manually select the additional information itself. The paste template may provide a mapping of extracted tokens into the target file.

In one embodiment, the copy template may be determined or defined by the end user using a user interface associated with a source application and the paste template may be determined or defined by the end user using a user interface associated with a target application. The source application and/or the target application may comprise web applications with web-based user interfaces.

In some embodiments, a source file, from which data may be copied or temporarily stored in a buffer (e.g., via a clipboard application or clipboard), may comprise a word processing document, spreadsheet, or webpage. A software application may arrange or display the data from the source file in a grid, list, or other structured format. Each row of a grid or list may only display a limited number of properties or data values associated with the row. For example, each row may correspond with a business entity, but each row may only display a subset of the total number of properties and data fields associated with the business entity. In some cases, in order to display additional information associated with the row, a detailed page associated with the row may need to be manually selected. In some embodiments, a copy template may provide instructions for extracting the additional information without having to manually select the detailed page (or the additional information). A copy template may also allow multiple rows of data to be copied (e.g., to a clipboard) even though only a single row is selected. In some cases, the row from which data is copied may be determined by simply moving a mouse pointer over any portion of the row (no need to click) and pressing a key combination, such as Ctrl+C. The copied data may then be pasted into a target file.

FIG. 2A depicts one embodiment of a spreadsheet. As depicted, the spreadsheet includes three rows associated with three different contracts (i.e., ContractA, ContractB, and ContractC). The spreadsheet includes columns corresponding with various data fields (e.g., the name of a contract and the status of a contract). Each of the data fields of a particular row may store a character string, which may be parsed. In one example, character string 204 (i.e., corresponding with the string ContractA) may be parsed along with the other character strings found in the first row of the spreadsheet. The spreadsheet may be displayed and/or edited using a spreadsheet application. Upon an end user selection 202 of the first row (e.g., using a mouse pointer or a finger touch on a touchscreen display), information associated with the first row may be copied or extracted. In some cases, additional information not displayed to the end user (e.g., hidden on a details page associated with the first row) may also be copied or extracted and stored for future reference (e.g., stored in the clipboard).

FIG. 2B depicts one embodiment of a portion of a paste template. As depicted, the paste template includes text (e.g., "Name:" and "Contract Type:"), formatting, and variables associated with extracted tokens. For example, the paste template may map an extracted token corresponding with a contract name (e.g., character string 204 in FIG. 2A) to a location associated with the variable $Contract_Name 206 and map an extracted token corresponding with a currency type to a location associated with the variable $Currency_Type 210. In one embodiment, the paste template may be associated with a particular application, such as a word processing application or an email application.

FIG. 2C depicts one embodiment of data written to a target file using a paste template, such as the paste template depicted in FIG. 2B. As depicted, the target file may be edited within a word processing application. The character string 246 has been written to the target file at a location associated with the variable $Contract_Name 206 in FIG. 2B and a character string 250 associated with a currency type has been written to the target file a location associated with the variable $Currency_Type 210 in FIG. 2B. It should be noted that the character string associated with the currency type may be extracted even though the data field itself is not displayed within a selected row of a spreadsheet, for example, such as the first row of the spreadsheet depicted in FIG. 2A.

FIG. 2D depicts one embodiment of data written to a target file using a paste template. As depicted, the target file may be edited within an email application. The paste template used for writing data to the target file (or inserting data into the target file) may be a function of the application used for editing the target file. The character strings 236 and 238 have been written to locations within the target file different from the locations corresponding with the paste template depicted in FIG. 2B. In one embodiment, a subset of the data extracted from a source file may be written (or pasted) to a target file based on an application in which the target file is opened. For example, the data extracted from the spreadsheet depicted in FIG. 2A may be written to a first file open in a word processing application using a first paste template associated with the word processing application (e.g., the extracted data may be written to the file depicted in FIG. 2C using the first paste template) or may be written to a second file open in an email application using a second paste template associated with the email application (e.g., the extracted data may be written to the file depicted in FIG. 2D using the second paste template).

Figure 2E:
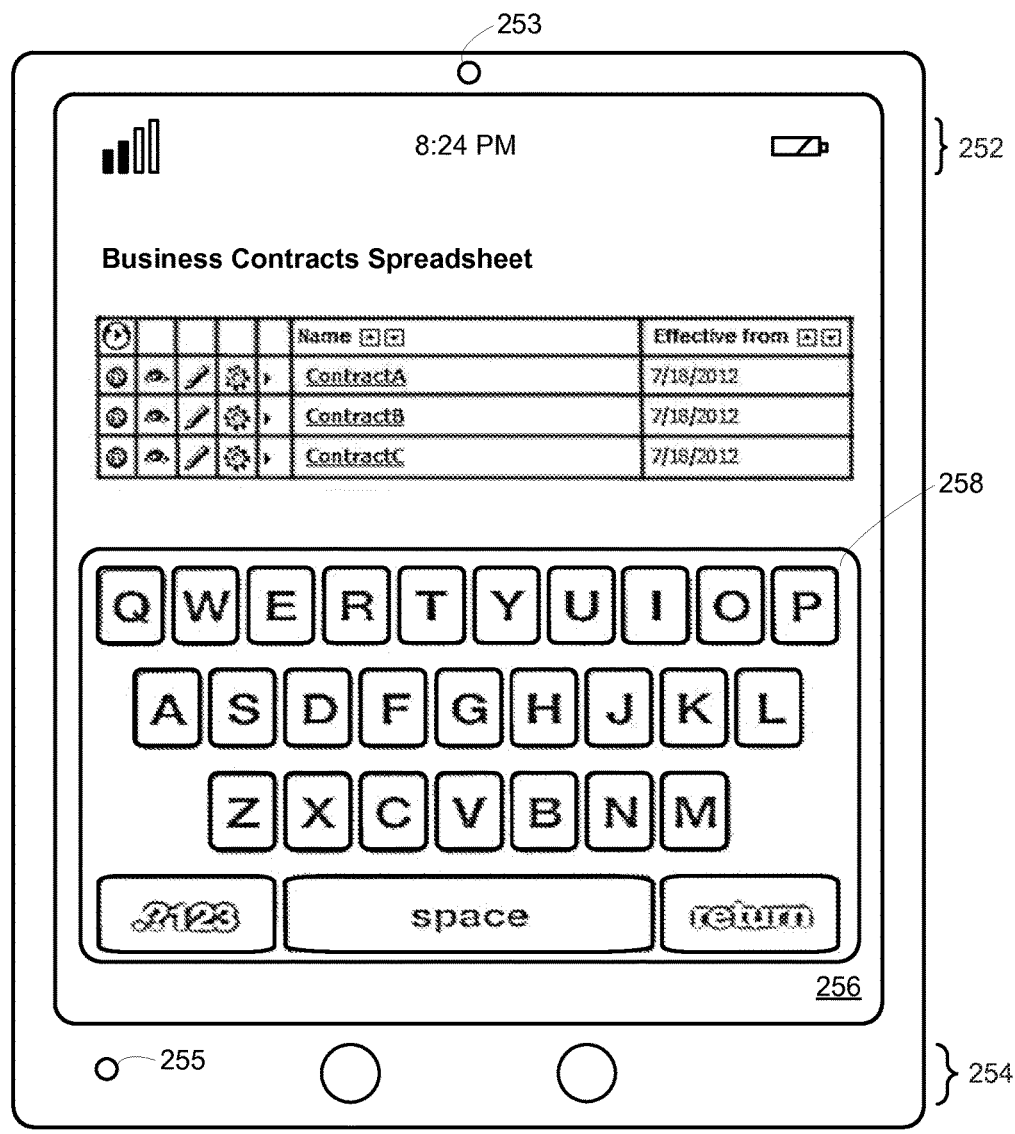
FIG. 2E depicts one embodiment of a mobile device running a spreadsheet application.

FIG. 2E depicts one embodiment of mobile device 140 of FIG. 1 running a spreadsheet application. As depicted, mobile device 140 includes a touchscreen display 256, physical control buttons 254, a microphone 255, and a front-facing camera 253. The touchscreen display 256 may include an LCD display for presenting a user interface to an end user of the mobile device. The touchscreen display 256 may include a status area 252 which provides information regarding signal strength, time, and battery life associated with the mobile device. The touchscreen display 256 may include a virtual keyboard 258 for data entry. As the display area of the mobile device may be limited (e.g., only a portion of a spreadsheet may be viewable at a time), using template-driven copy-and-paste (or cut-and-paste) functionality may allow an end user of the mobile device to be more efficient when working on home and business productivity applications running on the mobile device (e.g., copying data from a spreadsheet application running on the mobile device and then pasting a subset of the data into an email application running on the mobile device). In one example, data associated with a first row (or more than one row) may be copied from a spreadsheet and pasted into an email by positioning a cursor in any field of the first row and executing key combinations corresponding with the desired copy-and-paste (or cut-and-paste) functionality.

Figure 3A:
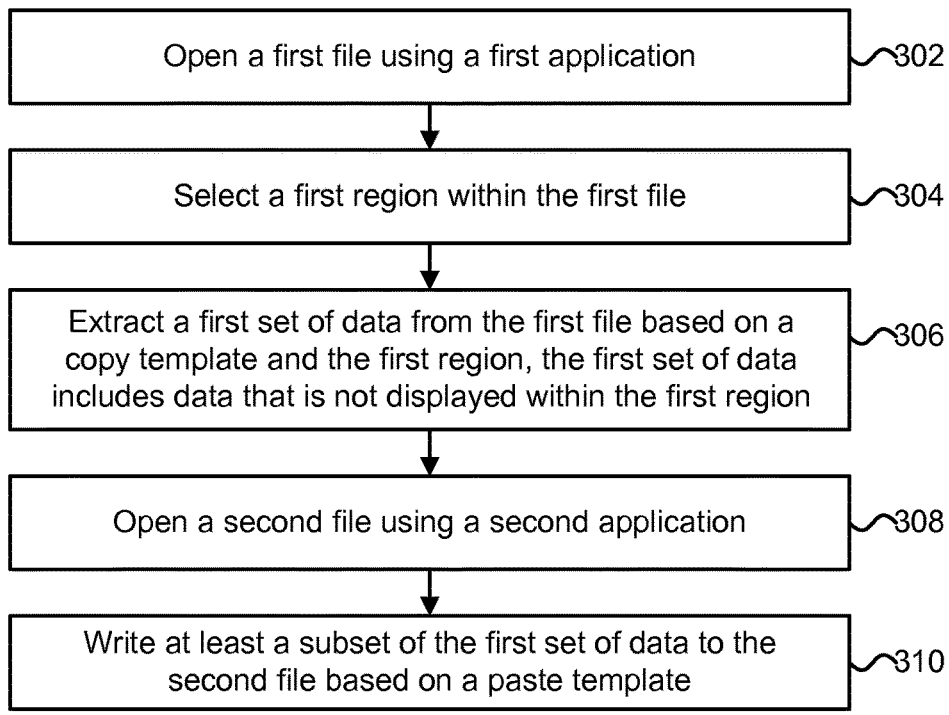
FIG. 3A is a flowchart describing one embodiment of a process for automating the transfer of data within a data file or between different data files.

FIG. 3A is a flowchart describing one embodiment of a process for automating the transfer of data (e.g., text or character strings) within a data file or between different data files. In one embodiment, the process of FIG. 3A is performed by a mobile device, such as mobile device 140 in FIG. 1.

In step 302, a first file is opened using a first application. The first file may comprise a text file or binary file. The first application may comprise a word processing application, spreadsheet application, email application, or other home and business productivity application. In step 304, a first region is selected within the first file. In one embodiment, an end user of a computing device, such as mobile device 140 in FIG. 1, may select the first region using a mouse pointer or a finger touch on a touchscreen display of the computing device. In some cases, the first region may be entirely highlighted by the end user. In other cases, the first region may correspond with a point location associated with a cursor or a point location corresponding with an end user selection of a portion of the first region. The first region may correspond with one or more rows in a spreadsheet.

In step 306, a first set of data is extracted from the first file based on a copy template and the first region. The copy template may provide grammatical rules for parsing the first file in order to extract tokens corresponding with one or more data fields within the first region. The tokens may comprise character strings and may be extracted using lexical analysis. The first set of data extracted may include data that is not displayed within the first region to the end user. In some embodiments, the copy template may provide instructions for extracting the additional information without having to manually select the additional information. The instructions may request a source application to obtain hierarchical data stored in a spreadsheet or database. The hierarchical data may be obtained by following a link or pointer to the additional information (e.g., located on a different worksheet). The instructions may also extract information that is not displayed to an end user due to viewing limitations associated with a display (e.g., in cases where a row corresponds with numerous columns or data fields). In some embodiments, data associated with the first region may be removed or deleted from the first file upon extraction of the first set of data. One embodiment of a process for extracting data using a copy template is described later in reference to FIG. 4.

In step 308, a second file is opened using a second application different from the first application. In other embodiments, the second file may be opened using the first application. For example, a word processing application may open both the first file and the second file. In step 310, at least a subset of the first set of data is written to the second file based on a paste template. The paste template may provide a mapping of extracted tokens into the second file. In some embodiments, the first file may comprise a spreadsheet document that includes data displayed in a grid (or other structured format). Each row of the grid may display a first set of data values associated with the row. The second file may comprise a draft email. The at least a subset of the first set of data may comprise a subset of the first set of data. In one example, the first set of data may include eight character strings and the subset of the first set of data written to the second file may comprise three of the eight character strings. One embodiment of a process for writing data based on a paste template is described later in reference to FIG. 5.

Figure 3B:
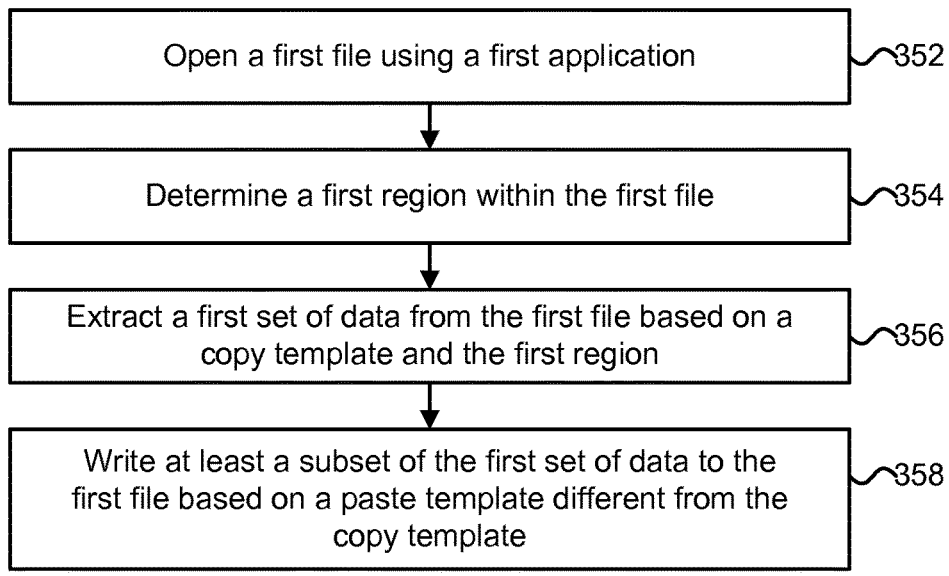
FIG. 3B is a flowchart describing an alternative embodiment of a process for automating the transfer of data within a data file or between different data files.

FIG. 3B is a flowchart describing an alternative embodiment of a process for automating the transfer of data (e.g., text or character strings) within a data file or between different data files. In one embodiment, the process of FIG. 3B is performed by a mobile device, such as mobile device 140 in FIG. 1.

In step 352, a first file is opened using a first application. The first file may comprise a text file or binary file. The first application may comprise a word processing application, spreadsheet application, email application, or other home and business productivity application. The first file may comprise a source file for extracting data fields.

In step 354, a first region is determined within the first file. The determination of the first region may be based on an end user selection of the first region. In one embodiment, an end user a computing device, such as mobile device 140 in FIG. 1, may select the first region using a mouse pointer or a finger touch on a touchscreen display of the computing device. In some cases, the first region may be entirely highlighted by the end user. In other cases, the first region may correspond with a point location associated with a cursor or a point location corresponding with an end user selection. The first region may correspond with one or more rows in a spreadsheet.

In step 356, a first set of data is extracted from the first file based on a copy template and the first region. The copy template may provide grammatical rules for parsing the first file in order to extract tokens corresponding with one or more data fields within the first region. The tokens may comprise character strings and may be extracted using lexical analysis. The first set of data extracted may include data that is not displayed within the first region to the end user. In some embodiments, the copy template may provide instructions for extracting the additional information without having to manually select the additional information. The instructions may request a source application to obtain hierarchical data stored in a spreadsheet or database. The hierarchical data may be obtained by following a link or pointer to the additional information (e.g., located on a different worksheet). The instructions may also extract information that is not displayed to an end user due to viewing limitations associated with a display (e.g., in cases where a row corresponds with numerous columns or data fields). In some embodiments, data associated with the first region may be removed or deleted from the first file upon extraction of the first set of data. One embodiment of a process for extracting data using a copy template is described later in reference to FIG. 4.

In step 358, at least a subset of the first set of data is written to the first file based on a paste template. The paste template may provide a mapping of extracted tokens into the first file. In some embodiments, the first file may comprise a spreadsheet document that includes data displayed in a grid (or other structured format). Each row of the grid may display a first set of data values associated with the row. The at least a subset of the first set of data may comprise a subset of the first set of data. In one example, the first set of data may include eight character strings and the subset of the first set of data written to the first file may comprise three of the eight character strings. One embodiment of a process for writing data based on a paste template is described later in reference to FIG. 5.

Figure 4:
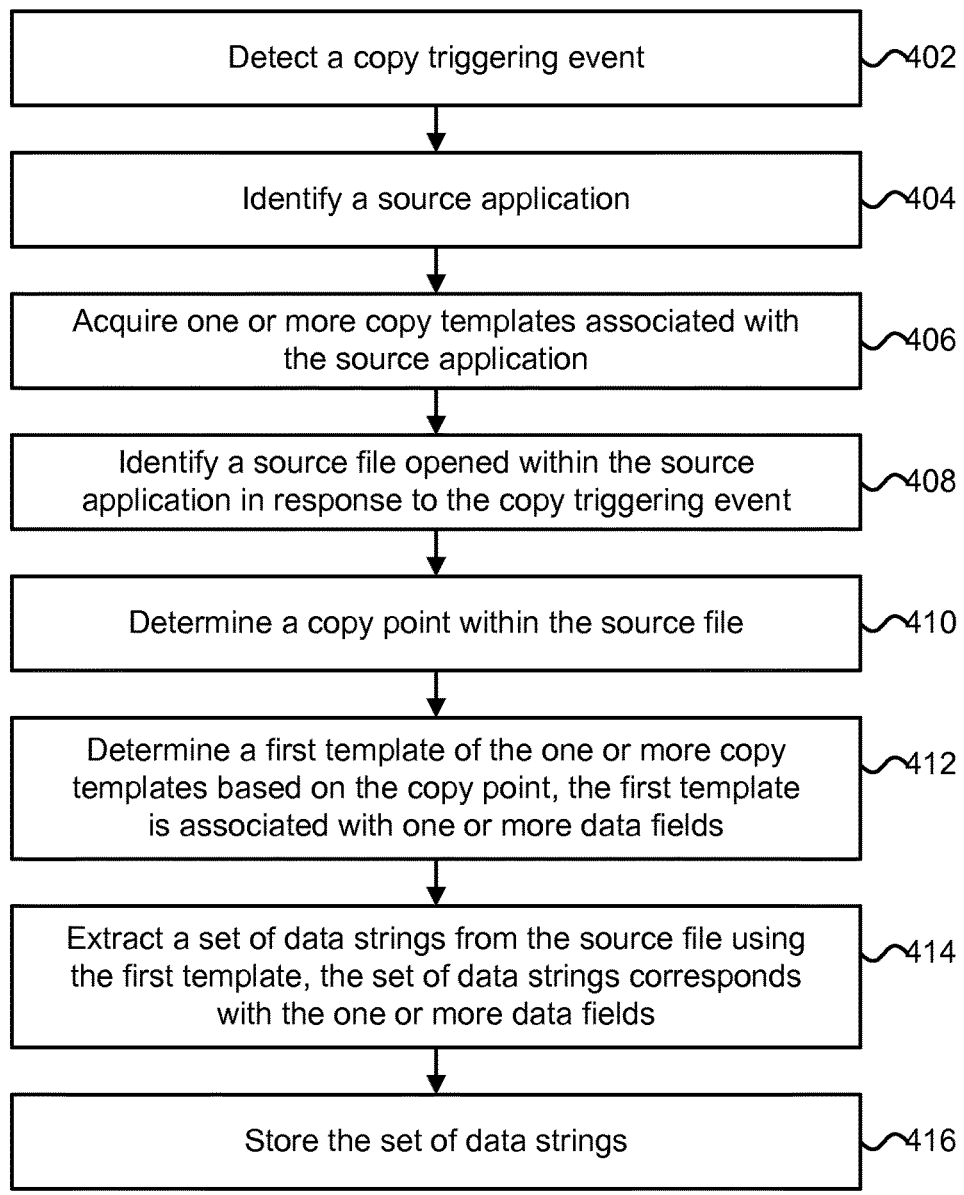
FIG. 4 is a flowchart describing one embodiment of a process for extracting data from a source file using a copy template.

FIG. 4 is a flowchart describing one embodiment of a process for extracting data from a source file using a copy template. The process described in FIG. 4 is one example of a process for implementing step 306 in FIG. 3A or for implementing step 356 in FIG. 3B. In one embodiment, the process of FIG. 4 is performed by a mobile device, such as mobile device 140 in FIG. 1.

In step 402, a copy triggering event is detected. The copy triggering event may comprise the detection of a particular key combination (e.g., Ctrl+C) or the detection of a particular voice command. In step 404, a source application is identified. The source application may comprise a word processing application running on a computing device or running on a server and controllable by the computing device. The source application may comprise a desktop application or a web-based application.

In step 406, one or more copy templates associated with the source application are acquired. Each of the one or more copy templates may correspond with a selected region within a file. In one example, a first copy template of the one or more copy templates may correspond with a selection of any point within a particular spreadsheet row, a second copy template of the one or more copy templates may correspond with a selection of multiple spreadsheet rows, and a third copy template of the one or more copy templates may correspond with a selection of multiple columns within a particular spreadsheet row. The one or more copy templates may be acquired from the source application itself or from a server, such as server 160 in FIG. 1.

In step 408, a source file opened within the source application is identified in response to the copy triggering event. The source file may comprise a text file or a binary file. The source file may comprise a data file editable or viewable using various home and business productivity applications. The source file may be identified as the most recently touched file opened within the source application or the file at the top of a file stack associated with the source application.

In step 410, a copy point within the source file is determined. The copy point may correspond with a single point within the source file associated with a current cursor location or an end user selection via a mouse pointer or a finger touch on a touchscreen display associated with a computing device running the source application. As the copy point may be determined based on the location of a cursor or mouse pointer within the source file, the copy point may be determined without the need for an end user to highlight (or click on) a particular area of the source file. In some cases, the copy point may correspond with a copy region. The copy region may be entirely highlighted by an end user of a computing device running the source application. The copy point may correspond with one or more rows in a spreadsheet.

In step 412, a first template of the one or more copy templates is determined based on the copy point within the source file. The first template may be associated with one or more data fields. The first template may provide grammatical rules for parsing the source file in order to extract tokens corresponding with one or more data fields. The tokens may comprise character strings and may be extracted using lexical analysis. In some embodiments, the first template may provide instructions for extracting additional information not directly observable by an end user of a computing device running the source application.

In step 414, a set of data strings is extracted from the source file using the first template. The set of data strings may correspond with the one or more data fields dictated by the first template. In one embodiment, each data string of the set of data strings may correspond with one of the one or more data fields. For example, the one or more data fields may correspond with eight columns in a spreadsheet and the set of data strings extracted from the source file may comprise eight character strings corresponding with a particular spreadsheet row and the eight columns. In step 416, the set of data strings is stored. The set of data strings may be stored in a clipboard for future pasting into the source file or another file. Each data string of the set of data strings may be stored with a mapping to a corresponding data field (e.g., data string "ContractA" may map to a data field associated with a contract name or a variable $Contract_Name).

Figure 5:
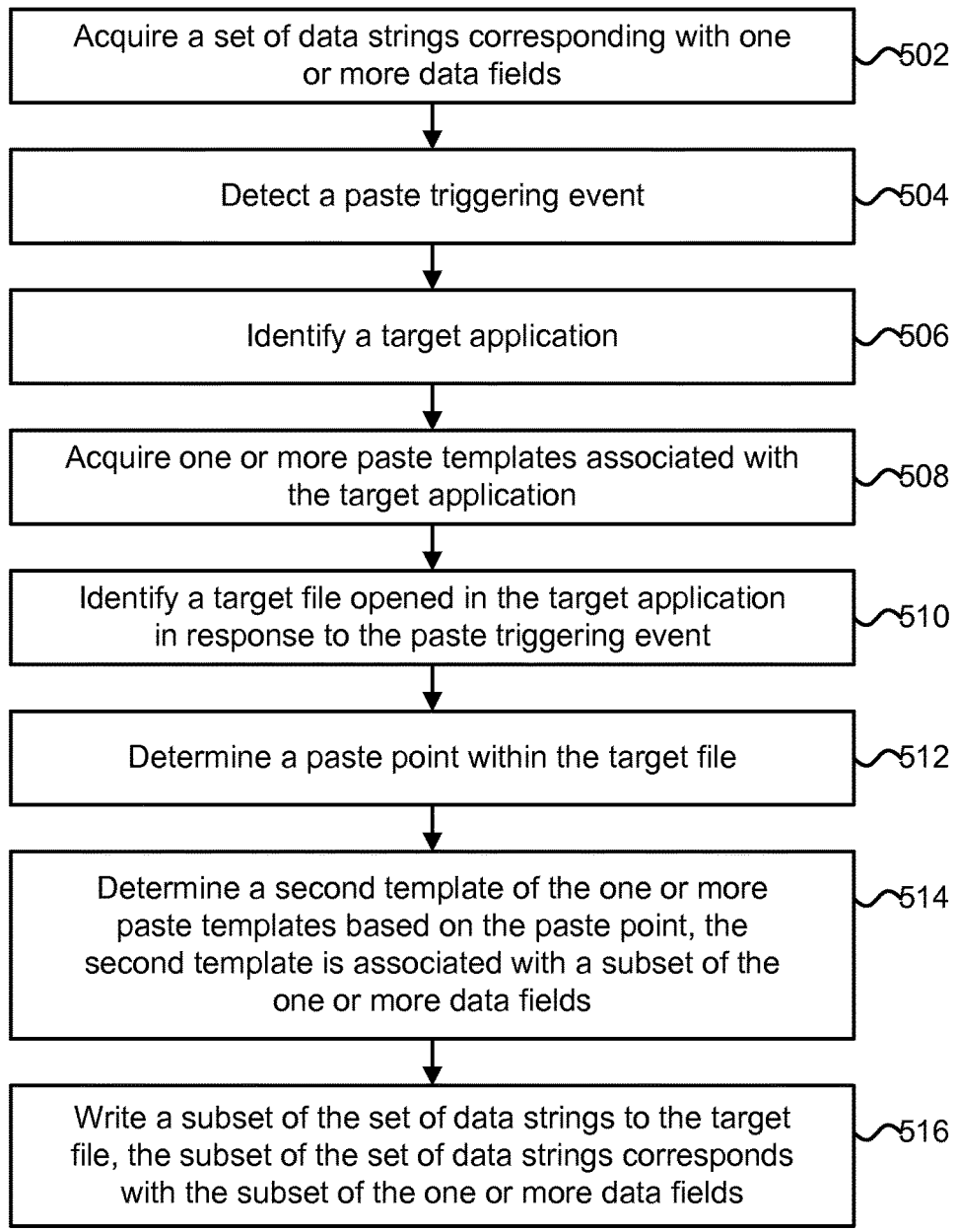
FIG. 5 is a flowchart describing one embodiment of a process for writing data to a target file using a paste template.

FIG. 5 is a flowchart describing one embodiment of a process for writing data to a target file using a paste template. The process described in FIG. 5 is one example of a process for implementing step 310 in FIG. 3A or for implementing step 358 in FIG. 3B. In one embodiment, the process of FIG. 5 is performed by a mobile device, such as mobile device 140 in FIG. 1.

In step 502, a set of data strings corresponding with one or more data fields is acquired. The set of data strings may be acquired from a temporary buffer or clipboard. In step 504, a paste triggering event is detected. The paste triggering event may comprise the detection of a particular key combination (e.g., Ctrl+V) or the detection of a particular voice command. In step 506, a target application is identified. The target application may comprise a spreadsheet application or email application running on a computing device or running on a server and controllable by the computing device. The target application may comprise a desktop application or a web-based application.

In step 508, one or more paste templates associated with the target application are acquired. Each of the one or more paste templates may correspond with a selected region or point within a target file. In one example, the paste template applied may depend on a location within the target file. The one or more paste templates may be acquired from the target application itself or from a server, such as server 160 in FIG. 1.

In step 510, a target file opened within the target application is identified in response to the paste triggering event. The target file may comprise a text file or a binary file. The target file may comprise a data file editable or viewable using various home and business productivity applications. The target file may be identified as the most recently touched file opened within the target application or the file at the top of a file stack associated with the target application.

In step 512, a paste point within the target file is determined. The paste point may correspond with a single point within the target file associated with a current cursor location or an end user selection via a mouse pointer or a finger touch on a touchscreen display associated with a computing device running the target application. The paste point may correspond with a particular cell within a spreadsheet.

In step 514, a second template of the one or more paste templates is determined based on the paste point within the target file. The second template may be associated with one or more data fields (or a subset of the one or more data fields) acquired in step 502. The second template may provide a mapping of extracted tokens into the target file.

In step 516, at least a subset of the set of data strings is written to the target file based on the second template. In one embodiment, the at least a subset of the set of data strings may be inserted into the target file at a location associated with the paste point. The second template may provide a mapping of extracted tokens into the target file. In some embodiments, a source file may comprise a spreadsheet document that includes data displayed in a grid (or other structured format). Each row of the grid may display a set of data values associated with the row. In one example, the set of data strings may include eight character strings associated with the set of data values and the subset of the set of data strings written to the target file may comprise three of the eight character strings. In one embodiment, the set of data strings may correspond with text that is displayed in a horizontal manner in a source file (e.g., spreadsheet data in a particular row) and the subset of the set of data strings written to the target tile may be written in a vertical manner (e.g., in columns of a draft email). In another embodiment, the set of data strings may correspond with text that is displayed in a first style in a source file and the subset of the set of data strings may be written to the target tile using a second style different from the first style (e.g., a different font style or text formatting style). In some cases, the source file may comprise a text file and the target file may comprise an XML or HTML file.

Figure 6:
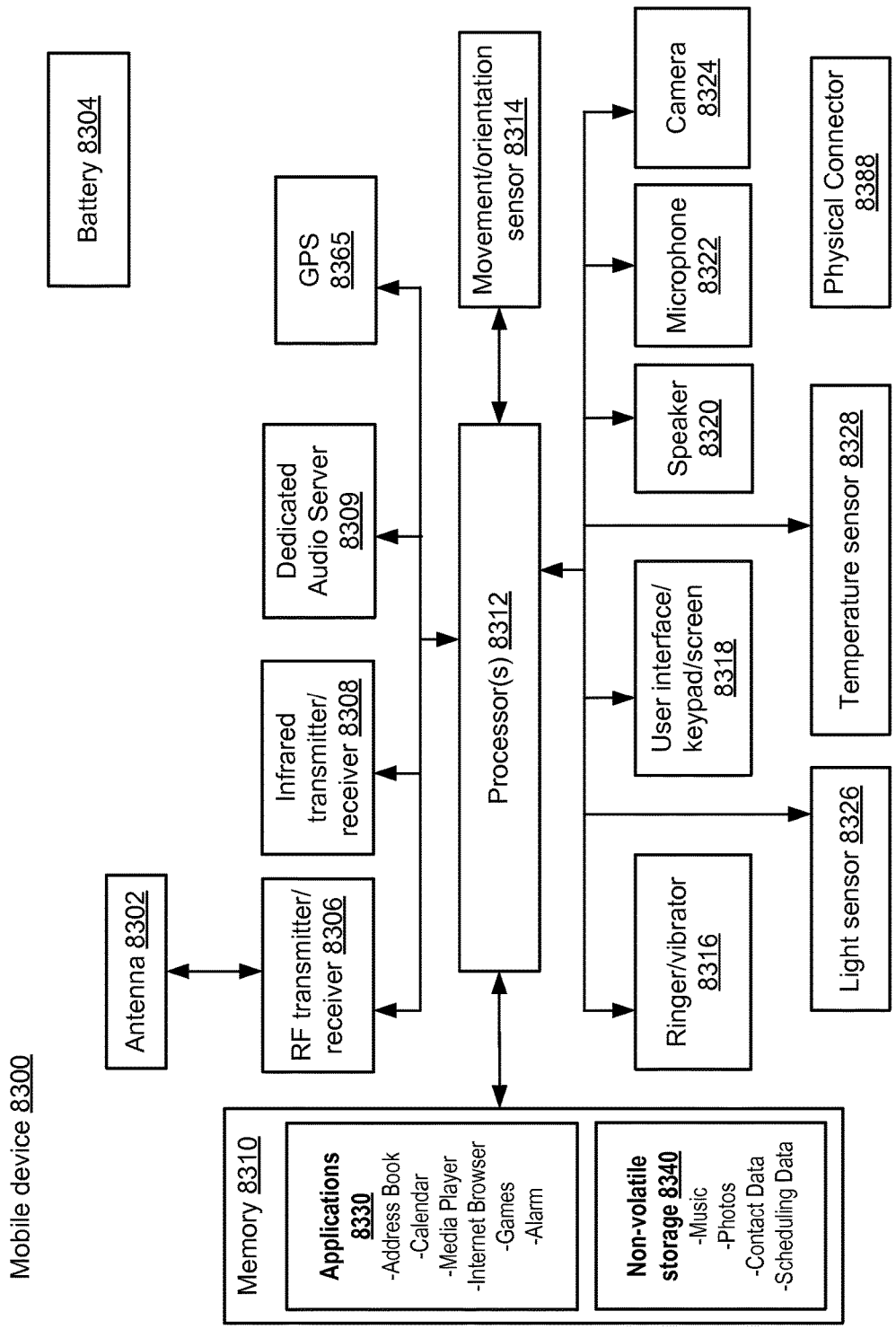
FIG. 6 depicts one embodiment of a mobile device.

The disclosed technology may be used with various computing systems. FIG. 6 depicts one embodiment of a mobile device 8300, which includes one example of a mobile implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   identifying a source file opened within a source application;
   determining a copy point within the source file, the determining the copy point within the source file comprises determining a location within the source file associated with a row of data and determining the copy point based on the location within the source file;
   acquiring a set of data strings corresponding with a set of data fields from the source file based on the copy point, the set of data fields corresponds with the row of data located within a first worksheet and hierarchical data located within a second worksheet different from the first worksheet that is linked to the row of data via one or more links, the set of data strings comprises a hidden string that was not displayed within the source file when the copy point was determined, the acquiring the set of data strings includes acquiring a copy template based on the copy point, the copy template includes a link of the one or more links to the hidden string, the acquiring the set of data strings includes extracting the row of data from the first worksheet and extracting the hidden string that was not displayed within the source file when the copy point was determined from the second worksheet different from the first worksheet using the link;
   detecting a paste triggering event;
   identifying a target file opened in a target application different from the source application in response to detecting the paste triggering event;

identifying a paste template based on the target application, the paste template comprises mappings for a subset of the set of data fields less than all fields of the set of data fields into locations within the target file;

writing a subset of the set of data strings less than all data strings of the set of data strings corresponding with the subset of the set of data fields to the locations within the target file using the paste template, the subset of the set of data strings includes the hidden string; and displaying at least a portion of the target file comprising the subset of the set of data strings, the displaying the at least a portion of the target file includes displaying the hidden string within the target file.

2. The method of claim 1, further comprising:

detecting a copy triggering event;

identifying the source file opened within the source application in response to detecting the copy triggering event;

extracting the set of data strings from the source file using the copy template, each data string of the set of data strings corresponds with a data field of the set of data fields; and storing the set of data strings.

3. The method of claim 2, wherein:

the copy point corresponds with a location within the first worksheet; and the acquiring the set of data strings includes acquiring a first data string of the set of data strings from the first worksheet and extracting the hidden string from the second worksheet.

4. The method of claim 2, wherein:

the copy template comprises a set of grammatical rules for parsing the source file to extract a set of tokens corresponding with the set of data fields, each token of the set of tokens comprises a character string.

5. The method of claim 4, wherein:

the paste template comprises a mapping of the set of tokens into the target file.

6. The method of claim 2, wherein:

the storing the set of data strings comprises storing the set of data strings in a buffer associated with a clipboard application.

7. The method of claim 1, wherein:

the determining the copy point within the source file comprises determining a cursor location within the source file and determining the copy point based on the cursor location.

8. The method of claim 1, wherein:

the source application comprises a spreadsheet application; and the target application comprises an email application.

9. The method of claim 1, wherein:

the identifying a paste template based on the target application includes identifying the paste template from a plurality of paste templates based on the target application, a first paste template of the plurality of paste templates includes a first set of data field mappings into the target file, a second paste template of the plurality of paste templates includes a second set of data field mappings into the target file that are different from the first set of data field mappings into the target file.

10. The method of claim 1, wherein:

the detecting a paste triggering event is performed by a computing device;

the identifying a paste template based on the target application is performed by the computing device; and the writing a subset of the set of data strings is performed by the computing device.

11. A system, comprising:

a storage device configured to store a set of data strings corresponding with a set of data fields; and a set of processors in communication with the storage device, the set of processors configured to identify a source file opened within a source application and determine a copy point within the source file based on a determination of a location within the source file associated with a row of data, the set of processors configured to acquire the set of data strings from the source file based on the copy point, the set of data fields corresponds with the row of data located within a first worksheet and hierarchical data located within a second worksheet different from the first worksheet that is linked to the row of data via one or more links, the set of data strings comprises a hidden string that was not displayed within the source file when the copy point was determined, the set of processors configured to acquire a copy template based on the copy point, the copy template includes a link of the one or more links to the hidden string that was not displayed within the source file when the copy point was determined, the set of processors configured to extract the row of data from the first worksheet and extract the hidden string from the second worksheet different from the first worksheet using the link, the set of processors configured to detect a paste triggering event and identify a target file opened in a target application different from the source application in response to detecting the paste triggering event, the set of processors configured to identify a paste template based on the target application, the paste template comprises mappings for a subset of the set of data fields less than all fields of the set of data fields into locations within the target file, the set of processors configured to write a subset of the set of data strings less than all of the set of data strings to the locations within the target file using the paste template, the subset of the set of data strings corresponds with the subset of the set of data fields, the subset of the set of data strings includes the hidden string, the set of processors configured to cause the hidden string to be displayed within the target file.

12. The system of claim 11, wherein:

the copy point corresponds with a location within the first worksheet of the source file; and the set of processors configured to acquire a first data string of the set of data strings from the first worksheet and extract the hidden string from the second worksheet of the source file different from the first worksheet.

13. The system of claim 12, wherein:

the copy template comprises a set of grammatical rules for parsing the source file to extract a set of tokens corresponding with the set of data fields, each token of the set of tokens comprises a character string.

14. The system of claim 13, wherein:

the paste template comprises a mapping of the set of tokens into the target file.

15. The system of claim 11, wherein:

the source application comprises a spreadsheet application; and the target application comprises an email application.

16. A computer program product, comprising:
a non-transitory computer readable storage medium having computer readable program code embodied therewith, the computer readable program code comprising:
computer readable program code configured to identify a source file opened within a source application;
computer readable program code configured to determine a copy point within the source file based on a determination of a cursor location within the source file associated with a row of data;
computer readable program code configured to acquire a set of data strings corresponding with a set of data fields from the source file based on the copy point, the set of data fields corresponds with the row of data located within a first worksheet and hierarchical data located within a second worksheet different from the first worksheet that is linked to the row of data via one or more links, the set of data strings comprises a hidden string that was not displayed within the source file when the copy point was determined;
computer readable program code configured to acquire a copy template based on the copy point, the copy template includes a link of the one or more links to the hidden string that was not displayed within the source file when the copy point was determined;
computer readable program code configured to extract the row of data from the first worksheet and extract the hidden string from the source file second worksheet different from the first worksheet using the link;
computer readable program code configured to detect a paste triggering event and identify a target file opened in a target application different from the source application in response to the paste triggering event;
computer readable program code configured to identify a paste template based on the target application, the paste template comprises mappings for a subset of the set of data fields less than all fields of the set of data fields into locations within the target file;
computer readable program code configured to write a subset of the set of data strings less than all data strings of the set of data strings to the locations within the target file using the paste template, the subset of the set of data strings corresponds with the subset of the set of data fields, the subset of the set of data strings includes the hidden string; and
computer readable program code configured to display the hidden string within the target file.

17. The computer program product of claim 16, wherein the computer readable program code comprises:
computer readable program code configured to detect a copy triggering event; and
computer readable program code configured to extract the set of data strings from the source file using the copy template, each data string of the set of data strings corresponds with a data field of the set of data fields.

18. The computer program product of claim 17, wherein:
the copy template comprises a set of grammatical rules for parsing the source file to extract a set of tokens corresponding with the set of data fields, each token of the set of tokens comprises a character string.

19. The computer program product of claim 18, wherein:
the paste template comprises a mapping of the set of tokens into the target file.

* * * * *